United States Patent [19]

Gutowski et al.

[11] 4,444,922

[45] Apr. 24, 1984

[54] LOW ENERGY POLYMER-SOLVENT SEPARATIONS

[75] Inventors: Timothy G. Gutowski, Newton; Nam P. Suh, Sudbury, both of Mass.

[73] Assignee: Massachusetts Institute of Technology, Cambridge, Mass.

[21] Appl. No.: 299,744

[22] Filed: Sep. 8, 1981

[51] Int. Cl.³ ............................ C08L 9/00; C08J 3/10; C08K 5/01

[52] U.S. Cl. .................................... 523/339; 523/336; 523/343; 523/347; 526/70; 526/73; 528/501; 528/502

[58] Field of Search ............... 523/343, 347, 336, 339; 528/501, 502; 526/70, 73

[56] References Cited

U.S. PATENT DOCUMENTS

| | | | |
|---|---|---|---|
| 3,553,156 | 1/1971 | Anolick et al. | 528/502 |
| 3,726,843 | 4/1973 | Anolick et al. | 528/503 |
| 3,932,371 | 1/1976 | Powers | 526/70 |
| 4,319,021 | 3/1982 | Irani et al. | 528/501 |

OTHER PUBLICATIONS

Chem. Abs. 95-116146t(1981) Pincus "Dynamics of Fluctuations & Spinodal Decompositions in polymer blends #II".
Chem. Abs. 93-47366j, 1980, De Gennes "Dyn. of Fluct. & Spinodal Decomp . . . ".
Chem. Abs. 71-3785(1969) Gordon et al.
Chem. Abs. 82-171627g(1975) Nishi et al.

*Primary Examiner*—Herbert J. Lilling
*Attorney, Agent, or Firm*—Arthur A. Smith, Jr.; Thomas J. Engellenner

[57] ABSTRACT

A method for processing a polymer solution by changing the thermodynamic state of the solution to produce a dilute phase and a concentrated phase such that the thermodynamic state is sufficiently changed that the two phases are formed by spinodal decomposition.

18 Claims, 6 Drawing Figures

LOW ENERGY POLYMER-SOLVENT SEPARATIONS

BACKGROUND OF THE INVENTION

This invention relates to methods of separating polymers from solutions.

High molecular weight, elastic polymers find extensive usage in industry. Almost a billion pounds of synthetic rubbers, such as polybutadiene, are used yearly in the American automobile industry alone. Other synthetic elastomers, such as ethylene copolymers, butyl-rubbers and polyisoprene are used widely also in machinery, floor coverings and household goods.

The manufacture of some elastic polymers typically requires large amounts of energy and is carried out in solution with a solvent and various catalysts. For example, in manufacturing polybutadiene, a butadiene monomer is dissolved in commercial grade n-hexane (approximately 45% to 65% n-hexane with methylpentane, dimethylbutane and other organic residuals). In order to obtain a rubbery polybutadiene, organo-metallic and other catalysts are used to produce the cis-isomer rather than the trans-isomer. The polymerization is conducted at elevated temperatuares and terminated by the addition of stoppers. When the reaction is completed the solvent is typically evaporated and recycled. The evaporation step is expensive in terms of energy used requiring over 5000 BTU per lb. of synthetic rubber which is produced.

Other elastomers are produced in similar fashions. Ethylene copolymers are formed by copolymerizing ethylene with at least one non-conjugated diene, and preferably with other $\alpha$-monoolefins such as propylene, as well. These copolymers are also formed in solutions of solvents such as tetrachloroethylene, or simple hydrocarbons such as pentane, hexane or heptane; the same problem of separating the polymer and solvent occurs in these systems. Likewise, elastomers such as polyisoprene are typically formed from isoprene monomer polymerized in hexane solutions. The product and the solvent are also separated by energy-intensive evaporative methods.

Attempts have been made to eliminate the solvent evaporation step in polymer production. For example, U.S. Pat. No. 3,553,156, issued to Anolick on Jan. 5, 1971, points out that ethylene copolymer solutions can exist as two phase systems and suggests that temperature and pressure can be varied to arrive at the two phase region. The two phase phenomenon in polymer-solvent systems is a result of the partial miscibility of the constituents. At the normal operating temperature and presure of polymer reactors the constituents exist as a single phase of uniform concentration, $C_o$. However, when subjected to sufficient heating or pressure changes, the system will break up into two phases at concentrations $C'$ and $C''$. Physically the solution becomes cloudy at the phase boundary due to the difference in the refractive indices of the two solutions.

At the concentrations encountered in industrial polymer reactions, phase-separation typically occurs as a nucleation and growth phenomenon of the solvent-rich phase. Although the method described by the Anolick patent can produce phase-separation, at industrial concentrations the resulting two-phase system exists as tiny bubbles of the solvent-rich phase trapped in an encapsulating, viscous, polymer-rich, phase. In such systems and especially for the industrially important high molecular weight polymers, the physical separation of the phases is extremely difficult and time-consuming.

Therefore, there exists a need for a low-energy method of separating polymers from solvents in high-concentration, industrial manufacturing solutions.

SUMMARY OF THE INVENTION

We have discovered that polymers can be separated from their formative solutions, without the need for evaporating the solvent, by forcing the solution into a thermodynamically unstable regime where two liquid phases, one dilute and the other a concentrated liquid phase, are formed by spinodal decomposition. More specifically, by proper control of the system variables, a state can be reached which differs from the "trapped solvent bubble" state, which occurs during conventional or nucleation and growth decomposition. Spinodal decomposition differs from the conventional decomposition in that the solvent-rich phase is formed in a strikingly different manner. The resulting product of spinodal decomposition is a network of channels and cavities which permits easy physical separation of the phases by gravity.

For high temperature phase tranformations, spinodal decomposition can be characterized by a boundary line above the conventional phase boundary line illustrated in phase diagrams. To reach the spinodal regime, one must pass through the conventional decomposition region and it is, thus, important to make this transition quickly in order to minimize the amount of solvent trapped in the "nucleation and growth" stage.

One method of inducing spinodal decomposition is to heat the solution rapidly, to a temperature above the spinodal. However, this method is not entirely satisfactory because polymer solutions typically have low thermal conductivity. At industrial concentrations there is a large metastable gap between the one-phase system and the spinodal regime; it is in this gap region that the metastable "nucleation and growth" phenomenon occurs.

A preferred method of inducing spinodal decomposition is to heat the solution rapidly while diluting it at the same time with additional solvent. The dilute solvent, which may be heated, serves to aid in heat transfer and mixing, as well as to reduce the size of the gap between the one-phase system and the spinodal, two-phase, regime.

Another preferred method is to increase the pressure of the solution so as to elevate the boundary line between the one-phase and two phase conditions, then to heat the solution while remaining below the elevated boundary line, and then rapidly to drop the pressure to form the two phase spinodal system.

DESCRIPTION OF THE PREFERRED EMBODIMENTS

Two components will mix if the resulting solution has a lower Gibbs free energy than the sum of the individual components. The polymer solutions discussed in this patent are partially miscible; while the components exist as one-phase solutions at normal reaction conditions, there is a phase boundary line at which the solutions can lower their Gibbs free energy by separating into two phases.

Figure 1:
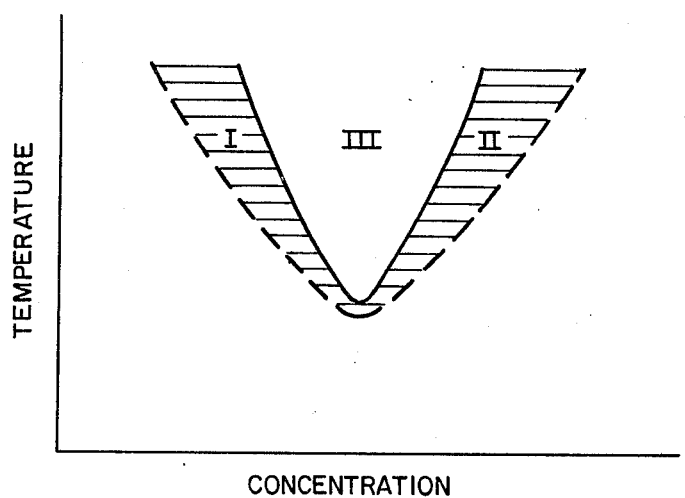
FIG. 1 is a phase diagram showing the conventional and spinodal two phase regions of a mixture.

In FIG. 1 temperature is plotted against concentration for a typical polymer solution. The dotted line in FIG. 1 is the phase boundary and represents the points of which solutions of given concentrations will separate into two phases. FIG. 1 is a representation of the phase boundary at a given pressure. Raising or lowering the system pressure results in elevating or suppressing, respectively, the boundary line. (The lowest possible equilibrium Pressure is, of course, the vapor pressure of the solution.)

Region I above the curve in FIG. 1 is typically characterized by nucleation and growth of the concentrate phase. In this region of the dilute solvent-rich phase predominates with polymer-rich nuclei forming and growing by accretion. Region I is of little interest because, in industrial practice, polymer solutions are rarely dilute enough for this to be of practical importance. Region II in FIG. 1 is more typical of industrial polymer solutions. In this region phase separation is typically characterized by nucleation and growth of the dilute phase amidst the predominant polymer-rich phase. Thus, in Region II solvent-rich nuclei grow slowly from the solution and, because of the viscosity of the surrounding polymer-rich phase, cannot be effectively separated.

Beyond the previously described regions, there is a third region where the two-phase regime is fundamentally different. In Region III, called the spinodal decomposition region, phase separation occurs as an unstable phenomenon, as opposed to the nucleation and growth of the concentrated phase (Region I) or the dilute phase (Region II). In other words, in Regions I and II metastable separation of the two phases occurs at well-defined interfaces with one phase growing from a nucleus of the proper concentration.

Spinodal decomposition, in contrast, is an unstable separation propagated by concentration fluctuations. The energy barrier associated with formation of interfaces is nonexistent. In the early stages, all concentrations between the yet-to-be formed dilute and concentrated phases exist. In the later stages, well defined boundaries exist. The resulting interpenetrating two phase structure permits easy separation by gravity.

We have discovered that physical separation of polymer solutions can be accomplished easily by taking advantage of the spinodal phenomena. While others, most notably Anolick in U.S. Pat. 3,553,156 have suggested that temperature and pressure can induce phase-separation in polymer solutions, it is clear that the prior art does not recognize the distinction between the above-described "nucleation and growth" regions and the spinodal region. To achieve a separable, two-phase system for industrially important high molecular weight polymers, it is necessary to reach the spinodal region quickly so that the system does not stabilize in Region II, where nucleation and growth effects predominate.

We have discovered two preferred methods for achieving separation.

Figure 2:
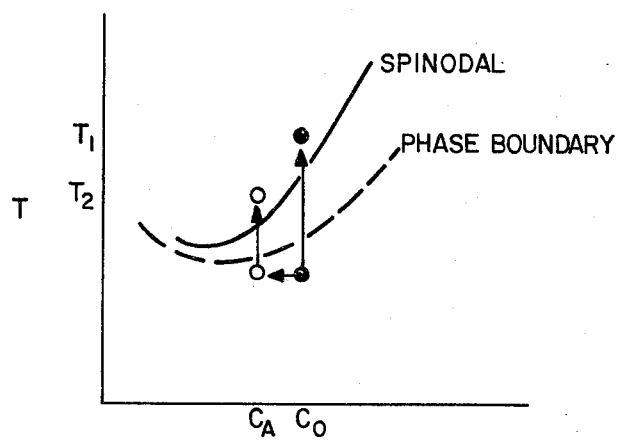
FIG. 2 is a diagram of one method of achieving spinodal decomposition.

In FIG. 2 the method of diluting and then rapidly heating the solution is illustrated. A solution at $C_o$ can undergo spinodal decomposition by rapidly heating to a temperature $T_1$, but this process is difficult because of the large metastable gap and the low thermal conductivity of the solution. As the solution is heated it must be driven through the "nucleation and growth" region. Alternatively the solution can be diluted to concentration $C_A$ and then heated to temperature, $T_2$. The advantage of this alternative is that the metastable gap of the solution is reduced and, hence, less time is spent in the nucleation and growth region above the phase boundary. For example, in a polybutadiene-hexane solution the metastable gap is 15° C. for a concentration of 12.3 percent. It is reduced to about 2° C. for a concentration of 7.9 percent.

Figure 3:
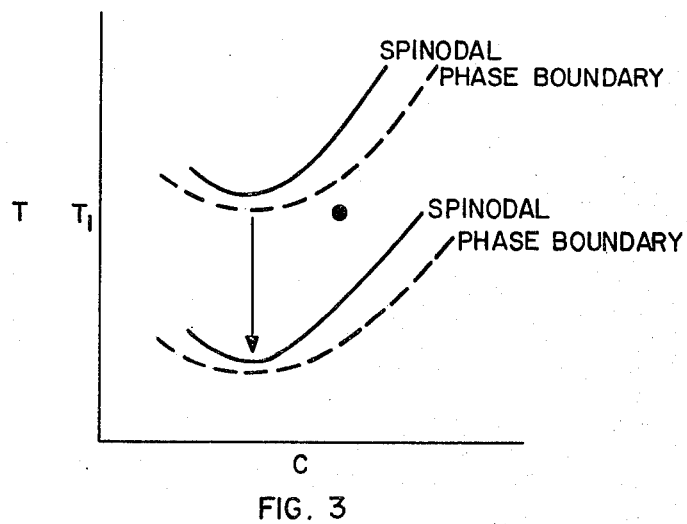
FIG. 3 is a diagram of another method of achieving spinodal decomposition.

In FIG. 3 the method of heating the solution and then rapidly dropping the pressure is illustrated. A solution of concentration $C_o$ can undergo spinodal decomposition by pressurizing the system and heating the solution to a temperature, $T_1$, which is just below the phase boundary, and then rapidly dropping the pressure, depressing both the phase boundary and the spinodal region boundary. The result is that the solution at concentration $C_o$ and temperature $T_1$ undergoes a nearly spontaneous decomposition with virtually no "nucleation and growth" effects.

Figure 4:
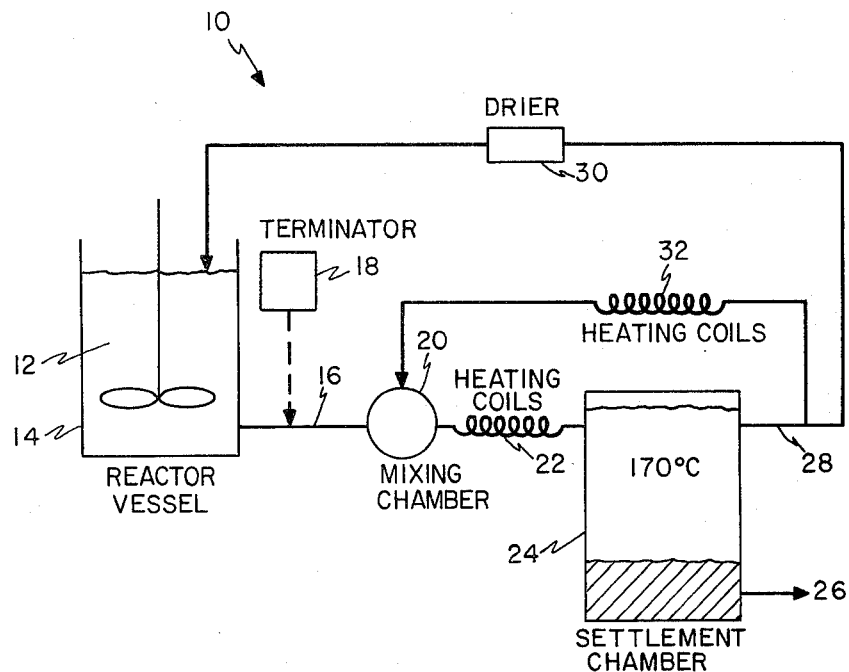
FIG. 4 is a schematic diagram of one system employing the present invention.

In FIG. 4 a system 10 is shown implementing the method of FIG. 2. The mixture 12 is formed in vessel 14 and, once polymerization has been completed, is drawn off via pipe 16. Typically a terminator 18, is added at this state. The terminated mixture is then introduced into a mixing chamber 20 where it is diluted. Once diluted, it passes through heating coils 22 where it is heated, preferably to at least 130° C. Once spinodal decomposition has occured, rapid gravity settlement can take place in chamber 24. The polymer-rich concentrate 26 is drawn off at the bottom of chamber 24 and the dilute phase 28 is also removed. A portion of the dilute phase flow is fed back to the mixing chamber 20 and a portion is returned to the reactor vessel 12. Preferably the dilute flow returning to vessel 12 is passed through a drier ($SiO_2$) 30 to remove any excess amounts of terminator 18. It is also preferable to include a heating coil 32 in addition to, or in lieu of, heating coil 22 to heat the diluent and thus induce decomposition.

Figure 5:
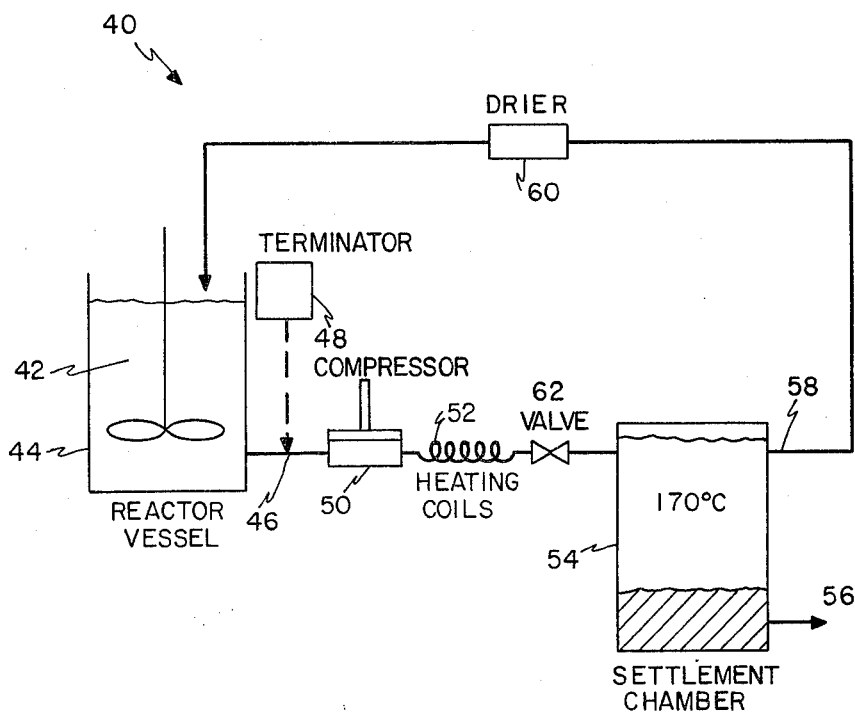
FIG. 5 is a schematic diagram of another system employing the present invention.

In FIG. 5 a system 40 is shown implementing the method of FIG. 3. The mixture 42 is formed in vessel 44 and, once polymerized, is drawn off via pipe 46. Again, a terminator 48, may be added at this stage. The terminated mixture is then introduced into a compressor 50 where the pressure is raised preferably to at least 450 psi. Once pressurized, the mixture is heated, preferably to at least 130° C., in heater 52 and then released through valve 62 into settlement chamber 54 where the thermodynamic effects induce spinodal decomposition and gravity settlement. The polymer-rich concentrate 56 is drawn off and the dilute phase 58 is also removed. The dilute phase may be recycled through drier 60 back to the reactor vessel 44.

Figure 6:
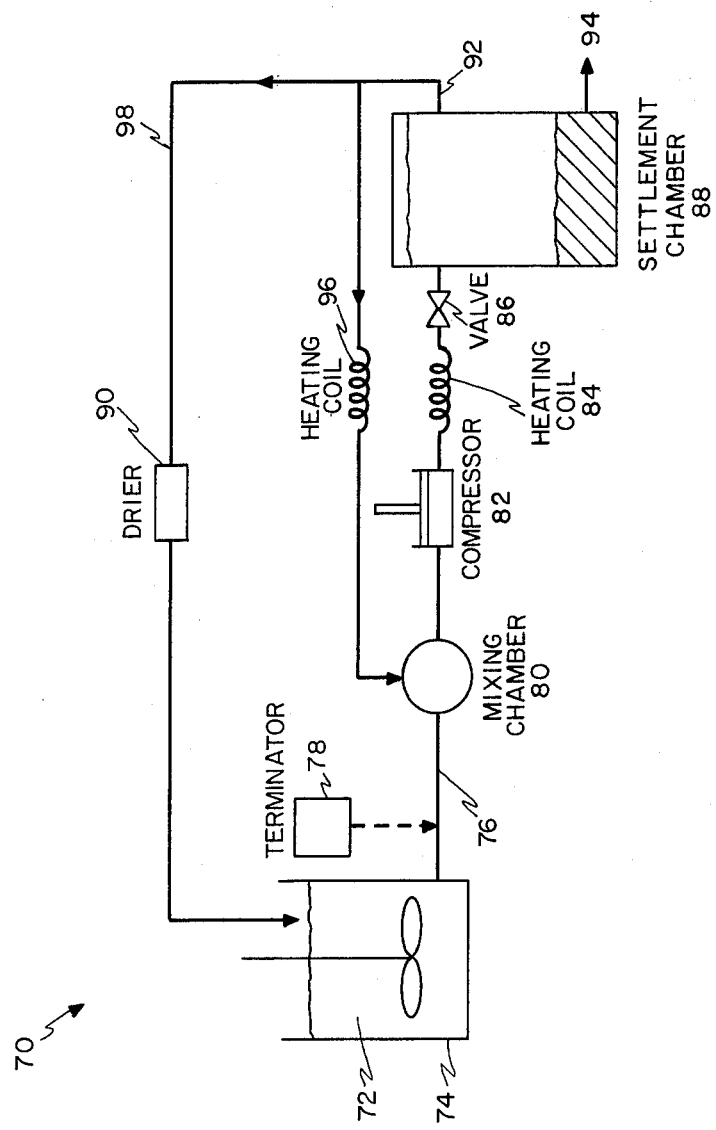
FIG. 6 is a schematic diagram of another system employing the present invention.

In FIG. 6, a system 70 is shown implementing a combination of the methods of FIGS. 2 and 3. The mixture 72 is formed in vessel 74 and, once polymerized, is drawn off via pipe 76. At this stage a terminator 78 may be added. The mixture is then introduced into a mixing chamber 80 where it is diluted. Once diluted, it is pressurized by compressor 82 and then heated by coils 84 before being released through valve 86 into settlement chamber 88, where the thermodynamic effects induce spinodal decomposition and gravity settlement. The polymer-rich concentrate 94 is drawn off at the bottom of the chamber 88 and the dilute phase 92 is also removed. A portion of the dilute phase flow is fed back through heating coils 96 to mixing chamber 80 and the remainder 98 is returned via drier 90 to the vessel 74.

The above-described methods and apparatus were used in our laboratories to separate high molecular weight polybutadiene solutions. The dilution and rapid heating method was tested in the apparatus 10 for a solution of about 12% polymer. The solution was diluted to about 8% polymer and then heated to about 170° C. As a result of spinodal decomposition, two phases were formed and separated. The polymer-rich phase was about 30% polymer and the solvent-rich phase was about 1.5% polymer. For each pound of polymer solution approximately 35 percent by weight was separated as polymer-rich concentrate. The remaining dilute phase was 65 percent by weight and approximately 90% of this remainder was recycled to the mixing chamber 20. Similar results are obtainable for a wide range of concentrations. Preferably, the polymer solution should have an initial concentration of at least five percent and should be diluted to a concentration not less than three percent polymer.

The pressure-drop method was tested in apparatus 40, again with a polybutadiene solution of about 12 percent. The solution was pressurized to about 1000 psi, and then heated to about 170° C. The pressure was then reduced rapidly to about the vapor pressure of the solution, about 170 psi. As a result of spinodal decomposition, two phases were formed and separated. Again, the polymer-rich phase was about 30% polymer and the solvent-rich was about 1.5% polymer. For each pound of solution approximately 38 percent by weight was separated as polymer-rich concentrate. The remaining 62 percent by weight dilute phase was recycled to the reactor vessel. It should be noted that under proper circumstances, the pressure-drop method can also be practiced without heating the pressurized solution, so long as initial reaction temperature is high enough and the settlement chamber is maintained at a low enough pressure.

Although our invention has been demonstrated in connection with polybutadiene-hexane solutions as described in the working examples above, it should be clear that other polymer solutions, such as isoprene-hexane solutions and solutions of ethylene copolymers in non-polar solvents (i.e. tetrachloroethylene, pentane, hexane or heptane), may also employ our invention.

What is claimed is:

1. A method for processing a conjugated diene polymer solution, the conjugated diene chosen from the group of polybutadiene and isoprene, the method comprising the steps of:
   (a) rapidly changing the thermodynamic state of said solution so as to produce a first phase having a relatively low polymer concentration and a second phase having a relatively high polymer concentration, said thermodynamic state being sufficiently changed that said first and said second phases are formed by spinodal decomposition;
   (b) permitting said second phase to separate physically from said first phase; and
   (c) removing said separated second phase.

2. A method for processing a conjugated diene polymer solution, the conjugated diene chosen from the group of polybutadiene and isoprene, and the solution having a first polymer concentration, the method comprising the steps of:
   (a) adding a solvent to said solution to dilute said solution so as to produce a solution having a second polymer concentration lower than said first polymer concentration;
   (b) rapidly heating said diluted solution to a temperature sufficient to form by spinodal decomposition, a first phase having a relatively low polymer concentration and a second phase having a relatively high polymer concentration;
   (c) permitting said second phase to separate from said first phase by gravity; and
   (d) removing said separated second phase.

3. The method of claim 2 wherein the step of adding solvent further comprises adding a heated solvent to said solution.

4. The method of claim 2 wherein the method further comprises recycling at least a portion of said first, separated, phase to dilute said solution to said solution of second concentration.

5. The method of claim 4 wherein the step of feeding back at least a portion of said solvent phase further comprises heating and then recycling at least a portion of said solvent phase.

6. The method of claim 4 wherein the method further comprises removing moisture from said first, separated, solvent phase prior to recycling said phase back to dilute said incoming solution.

7. A method for separating polybutadiene-hexane solutions according to the method of claim 2 wherein the step of heating said dilute solution further comprises heating said dilute solution to a temperature above 130° C.

8. A method for separating polybutadiene-hexane solutions according to the method of claim 2 wherein the method further comprises starting with a polymer solution with an initial concentration of at least about 5 percent polymer and diluting said solution to a concentration not less than about 3 percent polymer.

9. A method for processing a conjugated diene polymer solution, the conjugated diene chosen from the group of polybutadiene and isoprene, and the solution being at first pressure, the method comprising the steps of:
   (a) raising the pressure of said solution to a second pressure substantially higher than said first pressure;
   (b) heating said solution at said second pressure to a level below the temperature at which said solution decomposes into two phases;
   (c) rapidly reducing the pressure of said heated solution to a third pressure sufficiently low to cause said solution to form by spinodal decomposition, a first phase having a relatively low polymer concentration and a second phase having a relatively high polymer concentration;
   (d) permitting said second phase to separate from said first phase by gravity; and
   (e) removing said separated second phase.

10. The method of claim 9 which method further compreses recycling said first phase for reuse in forming said solution to be processed.

11. The method of claim 10 wherein the step of recycling further comprises heating and then recycling said first phase.

12. A method for separating polybutadiene-hexane solutions according to the method of claim 9 wherein the step of pressurizing said solution further comprises raising said solution to a second pressure above 450 psi.

13. A method for separating polybutadiene-hexane solutions according to the method of claim 9 wherein the step of heating said solution at said second pressure further comprises heating said solution to temperature above 130° C.

14. A method for processing a conjugated diene polymer solution, the conjugated diene chosen from the group of polybutadiene and isoprene, and the solution being at an elevated pressure and temperature, the method comprising the step of rapidly reducing the pressure of said heated solution to a pressure sufficiently low to cause said solution to form by spinodal decomposition a first phase having a relatively low polymer concentration and a second phase having a relatively high polymer concentration.

15. A method for processing a conjugated diene polymer solution, the conjugated diene chosen from the group of polybutadiene and isoprene, and the solution having a first polymer concentration at a first pressure, the method comprising the steps of:
(a) adding solvent to said solution to dilute the solution to a second, lower, concentration;
(b) raising the pressure of said solution at said second concentration to a second pressure substantially higher than said first pressure;
(c) heating said solution at said second pressure and said second concentration to a level below the temperature at which said solution decomposes into two solvent phases;
(d) rapidly reducing the pressure of said heated solution to a third pressure sufficiently low to cause said solution to form by spinodal decomposition, a first phase having a relatively low polymer concentration and a second phase having a relatively high polymer concentration.

16. The method of claim 15 wherein the step of adding solvent further comprises adding a heated solvent.

17. A method of processing polybutadiene polymers in non-polar solvent solutions according to claim 1, 2, 9, 14, or 15.

18. A method of processing polyisoprene polymers in hexane solvent solutions according to claim 1, 2, 9, 14, or 15.

* * * * *